June 18, 1929.    A. E. BRONSON    1,717,493
AIR GAUGE
Filed Sept. 4, 1923
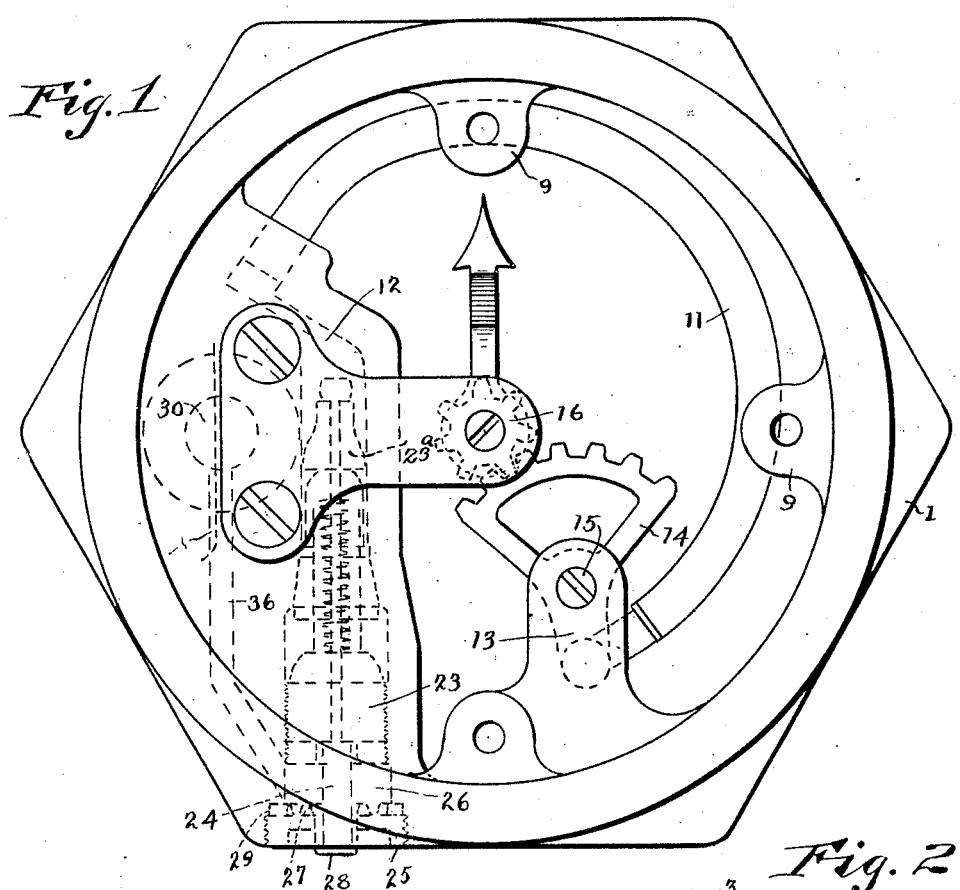
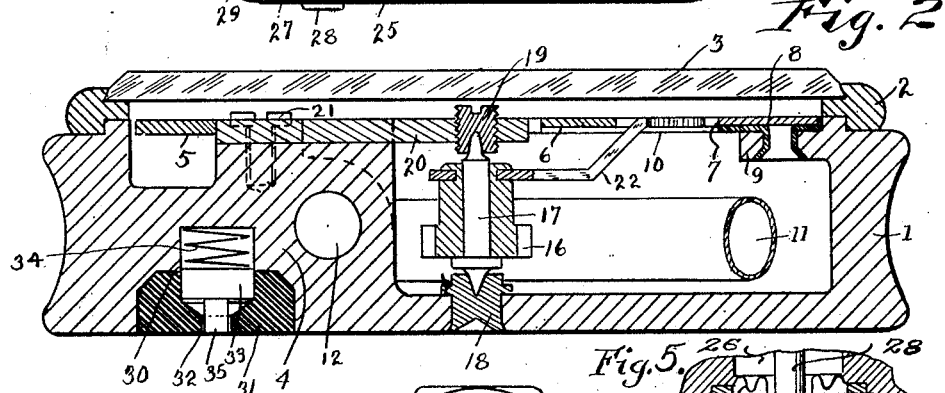
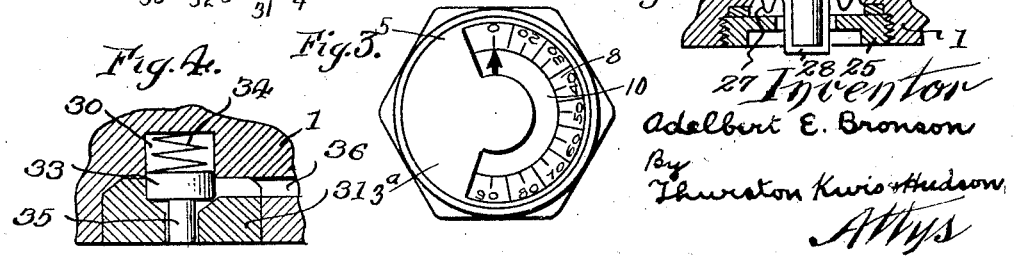
Inventor
Adelbert E. Bronson
By
Thurston Kwis + Hudson
Attys Patented June 18, 1929.

1,717,493

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

AIR GAUGE.

Application filed September 4, 1923. Serial No. 660,690.

The present invention relates to a fluid pressure gauge which is particularly adapted for gauging the air pressure in pneumatic tires and other fluid containers in which a body of fluid is maintained under pressure.

An object of the invention is to provide a gauge of the type having a pressure chamber in which means is provided for engaging with the valve of a pneumatic tire or other fluid container for establishing communication between the interior of the tire and the pressure chamber, together with means for retaining the pressure in the chamber after the gauge is withdrawn from the valve stem and for releasing the pressure from the chamber.

A further object is to provide a gauge in which the pressure indicator is retained in the position to which it has been forced by the fluid pressure after the gauge has been removed from the valve and in which the pressure sensitive actuating means for the indicator has to overcome a minimum of friction.

A further object is to provide means in connection with the pressure chamber of the gauge whereby the pressure within the chamber is retained without loss when the gauge is disconnected from the valve of the pneumatic tire or other fluid container.

A further object is to provide a gauge of such construction that it occupies a small space and of such shape that it may be conveniently carried in the pocket of the user.

Other objects will be apparent from the following description and accompanying drawings.

The following description and accompanying drawings set forth in detail certain means embodying the invention, the disclosed means, however, constituting but one of the various mechanical forms in which the principle of the invention may be employed.

Reference should be had to the accompanying drawings forming a part of this specification in which Fig. 1 is a top plan view on an enlarged scale showing the gauge with the cover and dial plates removed; Fig. 2 is a central transverse section on the same scale as Fig. 1; Fig. 3 is a top plan view showing approximately the size of the gauge, Fig. 4 is a section through the inlet chamber; Fig. 5 is a section through the check valve pressure chamber.

Referring to the drawings, the gauge shown herein is of the Bourdon tube type having a casing 1 which has a substantially flat bottom and a peripheral wall which is substantially circular on the inside and which may be polygonal in shape on the outside, the peripheral edge portion of the casing being transversely concave to provide an effective grip. A detachable cover is provided for the casing and consists of a ring 2 detachably secured in any suitable manner to the upper edge of the peripheral wall of the casing and having mounted therein a suitable transparent plate or crystal 3. To one side of the center thereof, the casing is provided with the thickened portion 4 in which the air passageways from the inlet to the Bourdon tube are formed. Secured in the upper portion of the casing is a circular plate 5 which has a cover portion 6 which overlies the thickened portion of the casing and the pointer actuating mechanism. The plate 5 is also provided with a peripheral portion 7 which is adapted to receive an arcuate graduated dial 8 and the plate 5 is suitably secured to integral lugs 9 projecting inwardly from the peripheral wall of the casing. Co-extensive with the graduated portion thereof and along the inner edge thereof the dial plate is provided with an arcuate slot 10 to receive the outer end of the pointer which cooperates with the graduated member. The crystal 3 preferably has a portion $3^a$ thereof rendered opaque as shown in Fig. 3 to conceal all of the interior parts except the end of the pointer and the graduations on the dial.

A Bourdon tube 11 has its open end anchored to the thickened portion 4 of the casing adjacent the peripheral wall thereof and communicates with an air passageway 12 which is formed in the thickened portion 4 of the casing and extends across the casing substantially parallel with the top and bottom thereof.

The closed end of the Bourdon tube is pivotally connected to an arm 13 of a gear segment 14 which is mounted to turn about a pivot 15 suitably mounted in the casing. The gear segment 14 meshes with a gear 16 which is fixed to a post 17 mounted at the center of the casing. The post 17 has pointed ends mounted in recessed bearing members 18 and 19, the bearing 18 being riveted in an opening in the bottom wall of the casing and the bearing member 19 being externally threaded and screwed into a bracket 20 which is rigidly secured by means of screws 21 to the top of the thickened portion 4 of the casing. The bearings for the post 17 are similar to those used for watch arbors and may be jeweled if desired. Rigidly attached to the gear 16 is a pointer 22, the outer end of which is offset upwardly and lies within the slot 10 of the dial plate. When pressure is introduced into the Bourdon tube 11, the pointer is actuated through the gear segment 14 and gear 16 moving through an arc proportional to the pressure within the tube 11 and the graduations on the dial will be so calibrated with respect to the movement of the pointer as to indicate the pressure in the tube 11.

The passageway 12 in the thickened portion 4 opens at its outer end through the peripheral wall of the casing and toward the outer end the passageway is enlarged and internally threaded to receive a standard check valve unit 23 such as used within the valve stems of pneumatic tires. The valve pin 24 of the check valve is elongated and extends beyond the outer end of the valve casing to adjacent the outer surface of the peripheral wall of the gauge casing. The wall of the gauge casing is recessed at the outer end of the passageway 12 to receive a centrally recessed closure plug 25 which has a central opening through which the valve pin 24 projects. The valve casing 23 is spaced inwardly from the plug 25 to form a chamber 26 and suitable means is provided for preventing escape of air from the chamber through the peripheral wall. A flexible diaphragm 27, which has a central cup-shaped portion 28 which extends through the opening in the plug 25, fits over the outer end of the stem 24 and has a corrugated body portion to impart flexibility thereto. The marginal portion of the diaphragm 27 is clamped to the casing by means of the screw plug 25, a suitable washer 29 being interposed between the plug and edge portion of the diaphragm. Pressure from a pneumatic tire is introduced into the gauge through a chamber 30 formed by registering recesses in the thickened portion 4 and in a packing 31 secured in a recess in the bottom of the casing and formed of rubber or other material adapted to form an air tight seal with the end of a valve stem. The outer face of the packing 31 is flush with the bottom of the casing and a central opening 32 therethrough communicates with the chamber 30. A plunger valve 33 is slidably mounted within the chamber 30 and is held in the bottom portion of the chamber by means of a suitable coil spring 34. The valve 33 is provided with a stem 35 which when the valve is in lowermost position, projects through the opening 32 with its lower end substantially flush with the bottom of the casing. A passageway 36 communicates with the lower portion of the chamber 30 at one end and with the chamber 26 at the opposite end. The passageway 36 communicates with the chamber 30 below the plunger 33 therein so that air may flow through the chamber and passageways to the Bourdon tube or from the Bourdon tube through the opening 32, the valve 33 serving to prevent entry of dust and dirt into the gauge when not in use.

When the gauge is used to determine the pressure in a pneumatic tire, the end of the stem 35 is pressed against the protruding end of the pin of the check valve at the end of the valve stem, the portion of the packing 31 about the opening 32 bearing against the end of the valve stem and forming a seal to prevent escape of air. The pressure upon the valve pin opens the valve and permits air to flow from the interior of the tire into the bottom of the chamber 30 lifting the plunger valve 33 so that air flows freely through the passageway 36 to the chamber 26 at the outer end of the valve casing 23. The pressure of the air acting upon the valve 23ᵃ carried by the inner end of the pin 24 forces the same inwardly, opening the passageway 12 and permitting flow of air into the Bourdon tube 11 establishing a pressure within the tube 11 substantially the same as within the tire. It is desirable that means be provided to hold the pointer in the position which it has assumed due to the pressure of the air of the tire. This is accomplished by means of the valve casing 23 which forms a check valve trapping the air within the Bourdon tube 11. The use of a valve separate from the air inlet has the advantage that the valve will close as soon as the pressure in the Bourdon tube balances the pressure in the tire and this will occur practically instantaneously so that the air will be trapped within the tube before the gauge is removed from the valve stem and there will be no loss of pressure when the gauge is removed from the valve stem.

The employment of a standard valve stem check valve is very desirable for the further reason that these valves are manufactured in large quantities, are very effective and inexpensive.

The holding of the indicator in reading position by trapping the air within the Bourdon tube enables the frictional resistance in the actuating mechanism to be reduced to a minimum since it is not necessary to provide frictional holding means for retaining the indicator in reading position and the only resistance to the movement of the indicator is the friction in the bearings which may be made to be so slight as to be negligible.

It is essential that means be provided for returning the pointer to zero position in order to enable a second reading to be taken. This is accomplished by releasing the pressure within the tube 11 by pressing inwardly upon the stem 24 with a finger, the diaphragm 27 having sufficient flexibility to permit of the necessary movement of the stem 24. The inward movement of the stem 24 opens the valve and the pressure within the tube 11 is thus immediately relieved through the passageway 36 to the inlet opening.

Having described my invention, I claim:

1. A pressure gauge comprising a substantially flat relatively thin casing having top, bottom and peripheral walls, said casing having a passageway therein opening at one end through the peripheral wall of the casing, a valve casing secured within said passage with the stem thereof toward the outside of the casing, means for preventing escape of fluid through said opening comprising a flexible diaphragm secured over the opening and covering the end of the valve stem, an inlet in the bottom of the casing communicating with said passageway outside the valve, means at the inlet for engaging a valve and opening the same, a pressure chamber communicating with the opposite end of the passageway and means for indicating the pressure in said chamber.

2. A pressure gauge comprising a casing having an inlet portion adapted to be applied to and establish communication with a container in which a body of fluid under pressure is maintained and a passageway leading from said inlet portion, a Bourdon tube connected to the opposite end of said passageway, pressure indicating means associated with said tube, a valve in said passageway adapted to retain the pressure in the tube after the gauge is disconnected from the source of pressure, and means whereby said valve may be manually operated to release said pressure.

3. A pressure gauge comprising a casing having an inlet portion adapted to be applied to a valve and to open the valve and a passageway leading from said inlet portion, a Bourdon tube connected to the opposite end of said passageway, pressure indicating means adapted to be operated by said tube, a check valve in said passageway independent of said inlet portion for preventing escape of air from said tube, said check valve having a stem accessible for manual operation to release said air.

4. A pressure gauge comprising a relatively thin casing with a substantially flat top and bottom, the bottom wall being thickened at one side of the center thereof and having a pair of passageways formed therein and extending substantially parallel with the top and bottom of the gauge, one of said passageways opening at its inner end to the interior of the casing and at its outer end to the periphery thereof, the other passageway communicating at its inner end with the first mentioned passageway adjacent the outer end thereof and terminating at its outer end in an inlet in the bottom of the casing, a Bourdon tube having its open end secured to the inner opening of the first mentioned passageway, pressure indicating means connected with the Bourdon tube, a valve casing secured within the outer portion of the first mentioned passageway with its stem extending to adjacent the end thereof, and a flexible diaphragm extending over the stem and covering the opening, said second passageway opening into the first between the valve casing and diaphragm.

5. A pressure gauge comprising a casing having a passageway therein opening at its outer end through a wall of the casing and a pressure chamber communicating with the inner end of the passageway, means for indicating the pressure within the chamber, a check valve in the passageway, said check valve having a stem projecting toward the outer end of the passageway and adapted to be manually operated to release the pressure within said chamber, means for preventing escape of fluid through the outer end of said passageway but permitting manual actuation of said valve stem to open the valve, and an inlet portion separate from said passageway and in communication therewith outside the check valve.

In testimony whereof, I hereunto affix my signature.

ADELBERT E. BRONSON.